Figure 1:
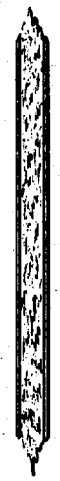

G. W. Chipman.
Carpet Lining.

№ 4,066. Reissued Jul 12. 1870.

Witnesses.
S. B. Kidder
M. W. Frothingham

Inventor.
George W. Chipman
by his Attys.
Crosby & Gould

United States Patent Office.

GEORGE W. CHIPMAN, OF BOSTON, MASSACHUSETTS.

*Letters Patent No* 60,476, *dated December* 18, 1866; *reissue No.* 4,066, *dated July* 12, 1870.

IMPROVEMENT IN CARPET-LINING

The Schedule referred to in these Letters Patent and making part of the same.

*To all whom it may concern:*

Be it known that I GEORGE W. CHIPMAN, of Boston, in the county of Suffolk and State of Massachusetts, have invented an Improved Manufacture of Carpet-Lining; and I do hereby declare that the following, taken in connection with the drawing which accompanies and forms part of this specification, is a description of my invention sufficient to enable those skilled in the art to practice it.

Letters Patent of the United States, No. 32,134, were issued, April 23, 1861, to John R. Harrington, for an improved manufacture of a carpet-lining, which, while possessing certain merits, is found, in practice, to be lacking in unity of parts, this causing considerable difficulty in the use of said manufacture, which it is the object of my invention to remedy.

The manufacture patented to the said Harrington consists in a layer of soft fibrous material placed between two sheets of paper or other fabric of close texture, without any other unity between the three component parts than that which is obtained by compressing them together in the manufacture.

This is found insufficient for the purpose, inasmuch as, in handling the goods, the soft fibrous material escapes from between the sheets of paper, especially when the fiber is of short length.

Another objectionable feature is that the dust, which will accumulate under and about carpets, works into the soft filling all along the edges of the paper or other close fabric, so that, when the carpet-lining is taken up for cleansing, only a small portion of the accumulated dust can be got rid of. Moreover, while the materials of the lining, being of vegetable matter, cotton, flax, hemp, &c., do not generate moths, those which get into the carpet can enter the lining at its open edges, and no system or process of cleaning can then get rid of them, they remaining in the lining ready to issue forth to injure the carpet when it is relaid after a cleansing.

My invention consists in inclosing the lap of fibrous material between two surfaces of paper when the lap is also enveloped or surrounded at its edges, so that, in effect, the lap is inclosed in a bag-like or flat tube-like wrapper, both broad surfaces and the opposite edges being all protected, instead of having only the top and bottom surfaces protected with paper left open at the edges, as in all carpet-lining of this kind made previously to my invention.

The invention may be practiced by leaving the layer of soft fibrous material a very little narrower on each side than the sheets of close texture between which said layer is placed, and then uniting the edges of the outer sheets by paste or other suitable cement, thus giving a sufficient unity to all the parts to enable the fabric to withstand the effects of ordinary handling and rendering it impervious to moths and dust.

Figure 1 of the drawing shows, in cross-section, the patented lining of Harrington's, before referred to.

Figure 2:
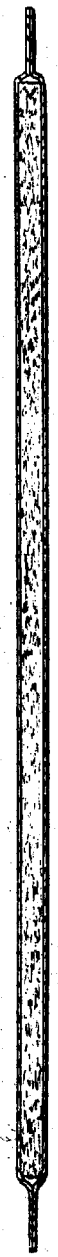

Figure 2 shows a similar view of the lining as improved by me.

I claim—

A carpet-lining composed of a lap of soft sheet fibrous material, surfaced or protected, not only upon its opposite sides, but also around its opposite edges.

GEO. W. CHIPMAN.

Witnesses:

C. WARREN BROWN,
HARRY P. SMITH.